March 10, 1942.　　　R. P. BREESE　　　2,275,944
GEAR SHIFTING MECHANISM
Original Filed Nov. 11, 1935　　　3 Sheets-Sheet 1

INVENTOR
ROBERT P. BREESE
BY H.O. Clayton
ATTORNEY

March 10, 1942.　　R. P. BREESE　　2,275,944
GEAR SHIFTING MECHANISM
Original Filed Nov. 11, 1935　　3 Sheets-Sheet 2
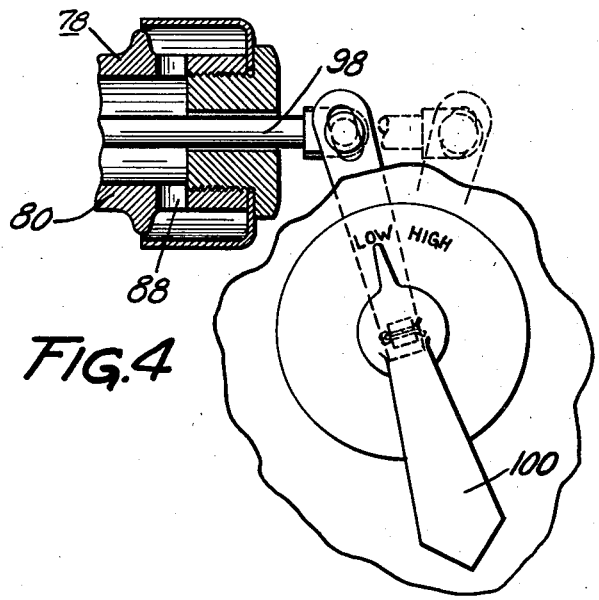
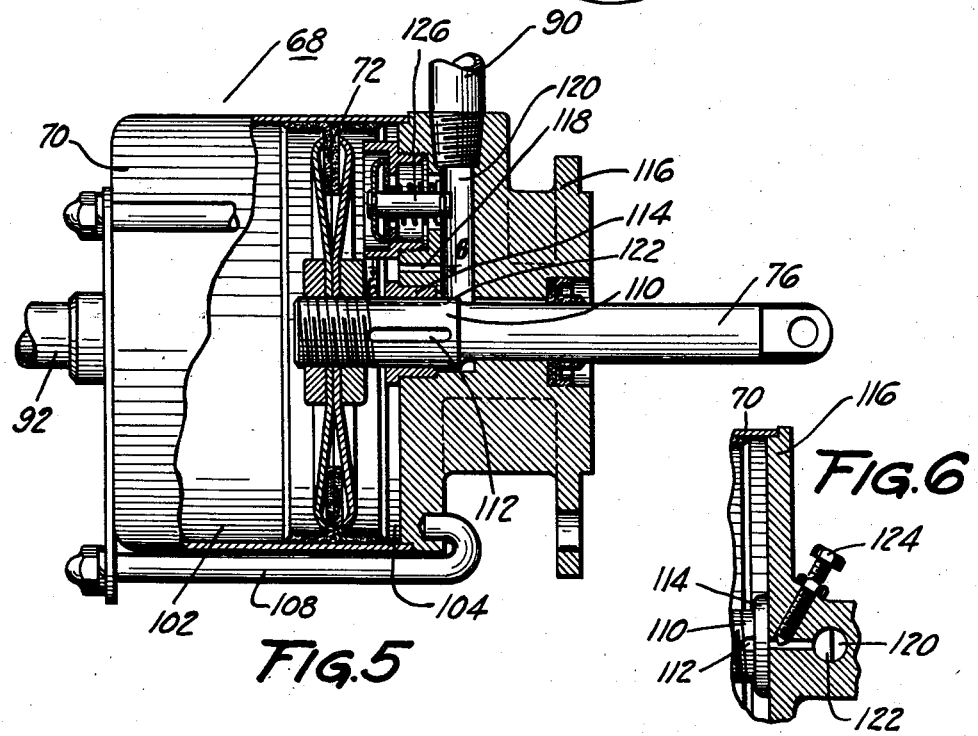
INVENTOR
ROBERT P. BREESE
BY
ATTORNEY

INVENTOR
ROBERT P. BREESE
BY
ATTORNEY

Patented Mar. 10, 1942

2,275,944

UNITED STATES PATENT OFFICE 2,275,944

GEAR SHIFTING MECHANISM

Robert P. Breese, New York, N. Y., assignor to Bendix Products Corporation, South Bend, Ind., a corporation of Indiana Original application November 11, 1935, Serial No. 49,156. Divided and this application May 28, 1937, Serial No. 145,216

8 Claims. (Cl. 74—364)

This invention in its broadest aspect relates to new and useful improvements in the power plant of an automotive vehicle.

More specifically, the invention relates to gear shifting mechanism and is of particular utility when employed in connection with speed-changing and direction-reversing gearing commonly used in coupling internal-combustion engines of automobiles with the driving vehicle wheels or other propelling devices.

One object of the invention is to provide power operated means for operating a two-speed transmission mechanism, preferably mounted on the differential housing of an automotive vehicle or mounted within said housing and constituting a part of the differential and rear axle construction. Such a mechanism is designed to supplement the conventional change-speed transmission by providing, in addition to the conventional three-speeds forward and reverse driving ratios, two additional driving ratios between the power plant and the rear wheels. Thus for each of the two settings of the supplemental transmission there are provided, by the standard transmission, four different gear ratios, making eight different ratios in all.

Such a mechanism provides a more efficient power plant, both in climbing hills and on level ground, there being a quiet performance of the motor at high vehicle speeds, and accordingly less wear and tear on the motor parts. On the boulevard or in the country with the car moving at say twenty to sixty miles per hour the two-speed transmission may be operated to select its high ratio; thereupon the car continues at the same speed and the motor speed drops say one-third of its former speed. There is thus provided a mechanism that insures a minimum of noise and vibration, saves wear and tear on moving parts, and in general prolongs the life not only of the motor but of the entire automobile.

According to one desirable construction, there is provided a pressure differential operated double-acting motor operably connected to a so-called two-speed rear axle mechanism, said motor being controlled by a manually operable double three-way selector valve.

Yet another object of the invention is to provide power means for operating the standard clutch of the vehicle, power means for operating a two-speed rear axle mechanism, and valvular means for controlling both of said power means including a master valve operable by the accelerator, and further including a manually operable selector valve.

A further and important object of the invention is to provide a power mechanism for operating a change-speed transmission, whereby a gear setting is effected in at least two different rates of movement of the gear to be meshed. Such an operation simulates a conventional manual operation of the gear shift lever, wherein said lever is moved relatively fast to first disengage the previously operating meshed gears and move the lever until the gears to be meshed just contact one with another, the driver sensing this contact; thereupon the driver moves the lever rather slowly as he feels the gears into mesh, and the instant after said gears are in mesh the engagement is completed at a relatively fast rate of movement. The shift lever is thus moved at at least two different rates of movement in effecting the desired meshing of gears. Such a mechanism is also of utility in effecting a slight wait or lag in shifting the transmission from its high to its low gear positions, thus enabling a proper synchronization of the speed of the engine with the speed of the vehicle.

Yet another object of the invention is to provide, in a power means for operating a change-speed transmission, a clutch operated master or pilot valve for in part controlling the operation of said power means, whereby the clutch must be disengaged in order to render the power means operative to actuate the transmission.

Other objects of the invention and desirable details of construction and combinations of parts will become apparent from the following description of a preferred embodiment, which description is taken in conjunction with the accompanying drawings, in which:

Figure 4 is a view disclosing the manually operable index means for operating the selector valve of Figure 2;

Figure 5 is an enlarged sectional view of the multistage pressure differential operated motor of the power mechanism of Figure 1;

Figure 6 is a partial sectional view of the motor mechanism of Figure 5, taken on the line 6—6 thereof.

Figure 1:
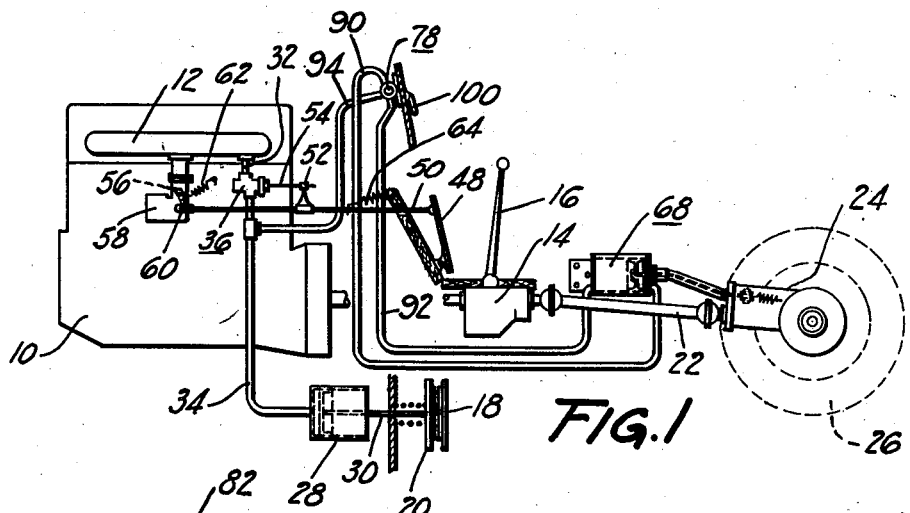
Figure 1 is a diagrammatic view of one embodiment of clutch and transmission operating mechanism constituting my invention.

Referring to the modification of the invention of Figure 1 of the drawings, there are disclosed certain of the elements of the vehicle power plant, including an internal-combustion engine 10 having an intake manifold 12, a conventional three-speeds forward and reverse transmission 14 operable by a gear shift lever 16, a conventional friction disc clutch interposed in the driving connection between the engine and transmission and comprising a driving element 18 and a driven element 20, a propeller shaft 22, and a conventional so-called two-speed rear axle or dual-ratio change-speed transmission mechanism 24 interconnecting the propeller shaft and rear wheels 26.

The invention has to do with power means for operating the clutch and two-speed rear axle mechanism, and to this end there is provided a pressure differential operated motor 28 operably connected by a connecting rod 30 with the driven element 20 of the friction clutch. The motor 28 is placed in fluid transmitting connection with the manifold 12 as a source of vacuum power by conduits 32 and 34 interconnected by a three-way valve 36, detailed in Figure 3. The latter valve comprises a casing 38 ported at 40, 42 and 44 to provide (1) means for connection with the conduit 32 leading to the intake manifold; (2) means providing a connection with the conduit 34 leading to the clutch operating motor 28; and (3) a vent to the atmosphere. The three-way valve further comprises a reciprocable plunger 46 operably connected to an accelerator pedal 48 by connections 50, 52 and 54. The connection 50, as will appear from Figure 1 of the drawings, serves to operate a butterfly valve 56 of the carburetor mechanism 58, a lost motion connection 60 being incorporated in said connection to operate the valve 36 prior to an operation of the valve 56. The latter is moved to its closed position by a spring 62.

Figure 3:
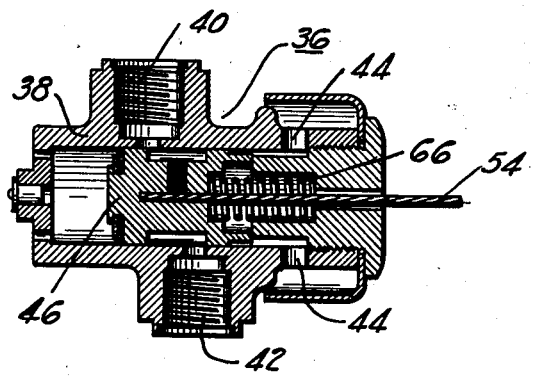
Figure 3 is a sectional view of the accelerator operated master or pilot three-way valve of the mechanism of Figure 1.

In operation, upon release of the accelerator, the butterfly valve 56 is first closed and the valve plunger 46 then moved, by an accelerator return spring 64, to a position disclosed in Figure 3 to interconnect the manifold with the clutch motor to thereby evacuate the latter and disengage the clutch. It is, of course, well known to those versed in this art that at closed throttle the intake manifold is evacuated to a degree sufficient to energize a clutch operating motor and likewise energize other vacuum operated accessories, e. g., a fuel pump or a windshield wiper.

Upon depressing the accelerator, a valve spring 66 functions to move the plunger 46 to the left, Figure 3, to cut off the connection between the manifold and motor and vent the latter to atmosphere via ports 44. The motor 28 is thus deenergized to permit the conventional clutch springs to reengage the clutch.

The aforementioned clutch operating mechanism is not claimed herein, inasmuch as the same constitutes the invention of Victor W. Kliesrath, described, disclosed and claimed in his Patent No. 2,152,059, dated March 28, 1939.

The important feature of the instant invention resides in the power means for operating the two-speed rear axle mechanism 24. Referring to Figures 1 and 5 of the drawings, there is disclosed a double-ended pressure differential operated motor 68 comprising a casing 70, a piston or power element 72 of the latter being operably connected to the two-speed transmission mechanism 24 by means of a connecting rod 76.

Figure 2:
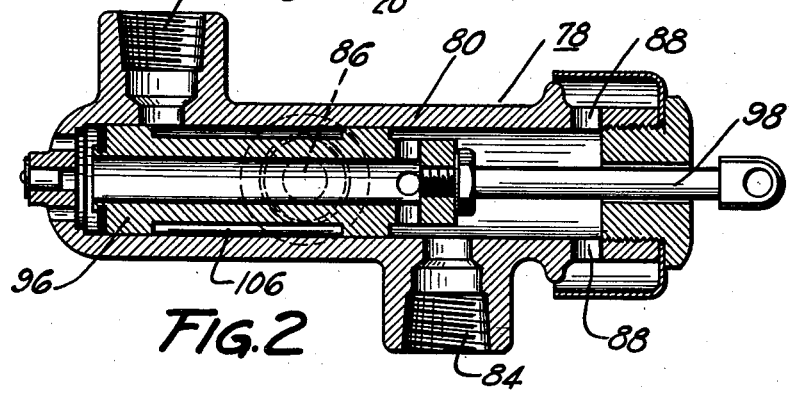
Figure 2 is a sectional view of the double three-way selector valve for in part controlling the transmission operating power means of the mechanism of Figure 1.

The energization and deenergization of the motor 68 to operate the aforementioned transmission are controlled jointly by the previously described pilot valve 36 and by a double three-way or so-called four-way selector valve 78, detailed in Figures 2 and 4. Such a valve makes unnecessary two separate three-way valve units, each of said units to control the gaseous pressure within one of the two compartments of the aforementioned double-ended motor 68. By means of the double three-way or so-called four-way valve described in detail hereinafter, a single valve connects one compartment of the motor to the source of vacuum and the other compartment to the atmosphere to energize the motor to effect one operation of the transmission and then reverses said connections to again energize the motor to effect another operation of the transmission. The four-way valve comprises a tubular casing 80 ported at 82, 84, 86 and 88 to provide connections respectively with a conduit 90 leading to one end of the motor casing 70, a conduit 92 leading to the other end of the casing 70, a conduit 94 leading to the previously referred to conduit 34, and with the atmosphere. A tubular valve member 96 reciprocably mounted within the tubular valve casing 80 is selectively operated, through the intermediary of a link 98, by a manually operated indexing handle 100, Figure 4, preferably conveniently mounted in the instrument panel of the vehicle.

Referring now to the operation of the above-described mechanism, with the engine idling and the accelerator released, the clutch is disengaged, as previously described, and a source of vacuum is provided to energize the motor 68. The operator may now move the selector valve 78 to the low gear position of Figure 4, thereby interconnecting a compartment 102 of the motor with the atmosphere via conduit 92 and valve ports 84 and 88 and interconnecting a compartment 104 of the motor with the intake manifold via conduit 32, valve 36, conduit 34, conduit 94, valve port 86, a recess 106 in the valve plunger 96, valve port 82 and conduit 90. The motor 68 is thus energized, the piston 72 moving to the position disclosed in Figure 5 to establish a low gear ratio setting of the transmission mechanism 24.

In addition to the operation of the transmission just described, the conventional change-speed transmission 14 is properly operated to place the same in low gear, whereupon the accelerator is depressed to vent the clutch motor 28 and transmission operating motor 68 to deenergize the same. The clutch is thus engaged and the vehicle is started. Subsequent conventional operations of the transmission 14 will then step up the speed of the vehicle as desired.

When the vehicle is under way at cruising speeds upon level ground, it is desirable that the speed of the engine be dropped without decreasing the speed of the vehicle. To this end the index lever 100 is moved to its high gear position, Figure 4, whereupon the motor 68 is again energized, upon closing the throttle, to effect the high gear setting of the transmission mechanism 24. When in its high gear position, the compartment 104 is vented to the atmosphere via the port 82 and conduit 90 and the compartment 102 is connected to the intake manifold by conduit 92. It will be noted that with the above-described mechanism the desired setting of the transmission 24 may be preselected prior to a release of the accelerator: however, the clutch and transmission are not operated unless and until the accelerator is released.

Reference will now be had to the most important feature of my invention, namely the multistage transmission operating mechanism. As disclosed in Figure 5, the multistage motor comprises the double-ended casing 70, the ends thereof being secured together by bolts 108. The piston member 72 is operably connected to the transmission 24 by the link 76, a hub portion 110 of the latter being provided with a plurality of annularly spaced grooves 112 adapted to cooperate, in a manner to be described hereinafter, with a bushing 114 in an enlarged end member 116 of the motor.

Describing the multistage operation of the mechanism of Figure 5, upon moving the valve member 78 to the low gear position of Figure 4, the right compartment 104 of the motor 68 is connected to the intake manifold via conduit 90, recess 106 in the valve plunger 96, and conduits 32, 34 and 94. The left compartment 102 of the motor is vented to the atmosphere via ports 84 and 88 in the valve casing and conduit 92. The differential of pressures acting on the piston 72 then serves to move the same to the right, to the position disclosed in Figure 5, to establish the low gear selection of the transmission. The first increment or stage of movement of the piston 72 is relatively fast by virtue of the relatively rapid egress of air from the compartment 104 via the space between the small diametered portion of the link 76 and the bushing 114 and also via a bleed port 118 in the end member 116, a duct 120 in said member, and conduit 90 connected with the manifold.

When the piston 72 has moved sufficiently to just bring the gears into contact one with another, a land portion 122 of the hub member 110 enters the bushing 114. Piston 72 continues to move to mesh the gears: however, said movement is at a relatively slow rate to enable said meshing to be effected. This relatively slow movement is effected by virtue of the relatively slow egress of air from the compartment 104 via the sole means of escape, namely the bleed port 118, duct 120 and conduit 90. After the piston has moved a distance sufficient to partly mesh the gears, the grooves 112 function to interconnect the compartment 104 with the duct 120, thus stepping up the rate of egress of air and the speed of movement of the piston and completing the meshing of the gears. There is thus provided three different and distinct rates of movement of the piston to effectively simulate a skillful and efficient manual operation of the transmission. If desired, a needle valve member 124, Figure 6, may be adjustably mounted in the member 116 to vary the size of the bleed port 118 and thus predetermine the rate of movement of the piston during its second or slow stage of movement. If desired, a one-way operating check valve 126 may also be incorporated in the end member 116 in order to insure substantially one rate of movement of the piston 72 in effecting the high gear position of the transmission. This valve is preferably designed to insure atmospheric pressure within the compartment 102 as the piston 72 is being moved to the left.

Figure 7:
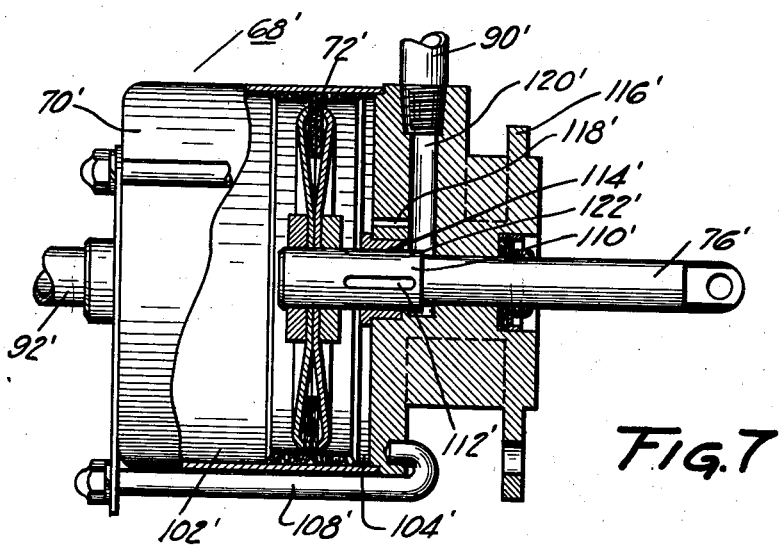
Figure 7 is a view similar to Figure 5, disclosing a slightly modified form of transmission operating motor, the check valve of the motor of Figure 5 being omitted to render the mechanism double acting.

If desired, however, the bushing 114, hub 110 and grooves 112 may be designed to effect a multistage gear shifting movement in establishing both the gear settings of the transmission. The mechanism disclosed in Figure 7 accomplishes this result, inasmuch as the aforementioned check valve is omitted from the end member 116' of the casing 70. As with the mechanism disclosed in Figure 5 and described supra, the grooves 112', land 122' and small-diametered portion 126 of the connecting rod or link 76' cooperate with the bushing 114', duct 120', bleed port 118' and remaining parts to provide successively in either direction a fast, slow and fast gear establishing movement of the piston or power element 72' of the pressure differential operated motor 68'. It is understood of course that the connection between the rod 76' and the transmission 74 is such as to effect the meshing of the gears.

The above-described mechanism is also disclosed in my copending application Serial No. 49,156, filed November 11, 1935, the instant application being a division thereof.

While one illustrative embodiment has been described, it is not my intention to limit the scope of the invention to the particular form shown, since it will be readily understood that the novel power operated gear shifting mechanism may be employed in connection with various types of transmissions having provisions for changing speed. Reference will, therefore, be had to the appended claims for a definition of the limits of the invention.

I claim:

1. In an automotive vehicle provided with a change-speed transmission mechanism of the type having gears adapted to be placed in and out of driving engagement with respect to each other, power means for shifting said mechanism comprising a vacuum operated double-ended motor operably connected to said transmission, said motor including a fixed casing member and a movable power element reciprocably mounted in said casing, and control valve mechanism for said motor including a manually operable selector valve for selectively connecting either end of said motor to a source of vacuum to thereby shift the gears of the transmission, and means for facilitating the driving engagement of the gears of the transmission comprising other valve mechanism for controlling a rate of energization of the motor for automatically retarding the movement of said power element in either direction as the gears are about to be drivably engaged, said latter valve mechanism including a grooved portion on the aforementioned power element cooperating with a portion of the cylinder element.

2. In a transmission operating device for motor vehicles provided with a change-speed transmission, means for placing the transmission in one or another gear ratio comprising a pressure differential operated motor including relatively movable members forming opposite chambers, both of said chambers being adapted for pressures approximately atmospheric and below, force transmitting linkage interconnecting one of said relatively movable members with the transmission to be operated, motor controlling valve means operative to lower the pressure in one of said chambers and at the same time render the pressure in the remaining chamber atmospheric or approximately so to thereby energize the motor and establish the transmission in one gear ratio, and, reversely, also operative to again energize the motor to establish another gear ratio setting of the transmission by lowering the pressure in the latter chamber and at the same time render the pressure in the other chamber atmospheric or approximately so, and other valve means, having a portion thereof constituting a part of the aforementioned force transmitting means, for effecting a variable rate of energization of said motor as the pressure within one or the other of said compartments is being changed as a result of the operation of the first-mentioned valve means, whereby there is provided a transmission operating means for effecting an irregular or variable movement of a part of the transmission when the transmission is being established in one of its settings.

3. In an automotive vehicle provided with a change-speed transmission, a double acting fluid motor having a pressure responsive device operably connected to the transmission, and effective to establish one or another gear ratio in accordance with the energization of one end or the other of said motor, means including a valve device for admitting fluid power to one or the other end of said motor, and a valve associated with said motor and positioned on one side of said pressure responsive device for varying the rate of change of pressure differential acting to move said last device in either of opposite directions irrespective of which end of the motor is being supplied with fluid power, whereby a plurality of rates of movement of the pressure responsive device in opposite directions is secured.

4. In an automotive vehicle provided with a change-speed transmission, a double acting fluid motor having a pressure responsive device provided with a rod operably connected to the transmission and effective to establish one or another gear ratio in accordance with the energization of one end or the other of said motor, means including a valve device for admitting fluid power to one end or the other of said motor, and a valve having a part formed in said rod and a second part associated with said motor, both parts being positioned on one side of said pressure responsive device and cooperating to vary the rate of change of pressure differential acting to move said last device in either of opposite directions irrespective of which end of the motor is being supplied with fluid power, whereby a plurality of rates of movement of the pressure responsive device in opposite directions is secured.

5. A shifting mechanism for a synchronizing motor vehicle transmission, comprising a fluid pressure operated shifting mechanism, control valve means for said mechanism, and auxiliary means controlling said mechanism by reducing the power of such mechanism for checking the speed of the shifting operation during the stage of shifting in which synchronization takes place.

6. A shifting mechanism for a synchronizing motor vehicle transmission, comprising a fluid pressure operated shifting mechanism, control valve means for said mechanism, and auxiliary means controlling the application of fluid pressures to said mechanism for checking the speed of the shifting operation during the stage of shifting in which synchronization takes place.

7. A shifting mechanism for a synchronizing motor vehicle transmission, comprising a fluid pressure motor for effecting the shifting operation, control valve mechanism for said motor, and auxiliary valve means controlling said motor to check the speed of the shifting operation during the stage of shifting in which synchronization takes place.

8. A shifting mechanism for a synchronizing motor vehicle transmission, comprising a fluid pressure motor for effecting the shifting operation, control valve mechanism for said motor, and a valve device for controlling the application of fluid pressures to said motor independently of said control valve mechanism to check the speed of the shifting operation during the stage of shifting in which synchronization takes place.

ROBERT P. BREESE.